US012693140B2

(12) United States Patent
Heumann et al.

(10) Patent No.: US 12,693,140 B2
(45) Date of Patent: Jul. 28, 2026

(54) SCANNING ELEMENT FOR AN INDUCTIVE POSITION MEASURING DEVICE

(71) Applicant: DR. JOHANNES HEIDENHAIN GmbH, Traunreut (DE)

(72) Inventors: Martin Heumann, Traunstein (DE); Marc Oliver Tiemann, Tettenhausen (DE); Oliver-Michael Sell, Traunreut (DE); Alexander Frank, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 180 days.

(21) Appl. No.: 18/892,988

(22) Filed: Sep. 23, 2024

(65) Prior Publication Data

US 2025/0109969 A1     Apr. 3, 2025

(30) Foreign Application Priority Data

Sep. 28, 2023     (EP) ..................................... 23200280

(51) Int. Cl.
*G01D 5/20*          (2006.01)
*G01B 7/00*          (2006.01)

(52) U.S. Cl.
CPC ........... *G01D 5/2053* (2013.01); *G01B 7/003* (2013.01)

(58) Field of Classification Search
CPC .............................. G01D 5/2053; G01B 7/003
See application file for complete search history.

(56) References Cited

U.S. PATENT DOCUMENTS

| | | | |
|---|---|---|---|
| 2011/0068777 A1* | 3/2011 | Tiemann .............. | G01D 5/2457 324/207.15 |
| 2021/0117020 A1 | 4/2021 | Hamner | |
| 2022/0178672 A1 | 6/2022 | Heinemann | |
| 2022/0178673 A1* | 6/2022 | Heinemann .............. | G01D 5/20 |
| 2023/0129608 A1 | 4/2023 | Tiemann | |
| 2023/0358523 A1* | 11/2023 | Sell ........................ | G01B 7/003 |

FOREIGN PATENT DOCUMENTS

EP          4170289 A1     4/2023

OTHER PUBLICATIONS

European Search Report issued by the European Patent Office on Mar. 5, 2024 in corresponding EP Patent Application No. 23200280.

* cited by examiner

*Primary Examiner* — Tung X Nguyen

(74) *Attorney, Agent, or Firm* — Carter, DeLuca & Farrell LLP

(57)          ABSTRACT

A scanning element for an inductive position measuring device includes a multilayer circuit board having a first receiving conductive path extending along a first direction and an excitation track. The first receiving conductive path is formed from a plurality of first conductive path sections that are wired in series. Along a subsection, two first conductive path sections are arranged in the structure of the circuit board, offset to each other with respect to a third direction and concurrently. Along a first section, which is arranged offset to the subsection in the first direction, a further one of the first conductive path sections extends in the structure of the circuit board, without a first conductive path section extending concurrently to the further first conductive path section with respect to the third direction.

24 Claims, 5 Drawing Sheets

SCANNING ELEMENT FOR AN INDUCTIVE POSITION MEASURING DEVICE

CROSS-REFERENCE TO RELATED APPLICATIONS

The present application claims priority to Application No. 23200280.8, filed in the European Patent Office on Sep. 28, 2023, which is expressly incorporated herein in its entirety by reference thereto.

FIELD OF THE INVENTION

The present invention relates to a scanning element for an inductive position measuring device, e.g., for determining the position of the scanning element relative to a scale element.

BACKGROUND INFORMATION

Inductive position measuring devices are used, for example, as angle measuring devices for determining the angular position of machine parts that are rotatable relative to each other or as length measuring devices for determining a position as a result of a linear displacement. In inductive position measuring devices, excitation tracks and receiving tracks, for example, in the form of conductive paths, are often applied to a common, usually multilayer circuit board that is firmly connected, for example, to a stator of an angle measuring device. For example, in certain configurations of the scanning element with a circuit board, the excitation tracks and receiving tracks can be formed from excitation conductive paths and receiving conductive paths. Opposite this circuit board is a scale element on which graduation structures are applied and which is connected to the rotor of the position measuring device. When a time-varying electrical excitation current is applied to the excitation conductive paths, signals dependent on the relative position are generated in the receiving conductive paths during the relative movement between the rotor and stator. These signals are further processed in an evaluation electronic system.

European Patent Document No. 4 170 289 describes an inductive position measuring device that has receiving conductive paths that are interrupted by gaps. This configuration is intended to help reduce sensitivity to pitch tilting.

SUMMARY

Example embodiments of the present invention provide a comparatively accurately operating, compact, and inexpensively producible scanning element for an inductive position measuring device, which scanning element is insensitive to pitch tilting.

According to example embodiments, a scanning element, which is suitable and intended for use in an inductive position measuring device, includes a multilayer circuit board having a first receiving conductive path extending along a first direction. The circuit board also has an excitation track. The first receiving conductive path includes a plurality of first loops, in which the first loops are formed from a plurality of first conductive path sections. The first conductive path sections are arranged in different layers of the circuit board and are connected to each other in series, e.g., by vias, and thus form an electrically continuous conductor track. Along a subsection, two first conductive path sections are arranged concurrently in the structure of the circuit board and offset with respect to (or, respectively, in) a third direction. The third direction is oriented orthogonal to the first direction. For example, two loops extend concurrently in the subsection offset in the third direction and offset relative to each other in the third direction in different layers of the circuit board. The loops are formed of first conductive path sections. Along a first section, which is arranged offset to the subsection in the first direction, another one of the first conductive path sections is arranged in the structure of the circuit board. In this section, however, there is no conductive path section that extends concurrently to the other first conductive path section and is offset in the third direction. Accordingly, in the structure of the circuit board, the other one of the first conductive path sections extends without a first conductive path section being offset with respect to the third direction and extending concurrently to the other first conductive path section.

The first direction represents the direction in which the required position is measured (measuring direction). Since, for example, the relative angular position between the scale element and the scanning element is to be measured by a position measuring device with the scanning element, the first direction is, for example, a circumferential direction or a tangential direction. Alternatively, the first direction may also be a linear direction if a relative displacement is to be measured.

In addition, a second direction extends orthogonal to the first direction.

The third direction is oriented orthogonal to the first direction and also orthogonal to the second direction. The third direction is orthogonal to the plane of the circuit board. In addition, individual layers of the circuit board are arranged offset from each other in the third direction. When measuring an angular position, the third direction extends parallel to a (rotary) axis about which the scale element is rotatable relative to the scanning element.

The scanning element can thus scan a linear scale or a curved, e.g., circular or circular segment-shaped, scale element, so that a linear position or an angular position can be measured. The first receiving conductive path can thus extend along the first direction over a linear path or a curved path. The path includes subsections, namely the subsection and the first section.

Concurrent conductive path sections are conductive path sections that extend in, or substantially in, the same direction, e.g., in the form of parallel curves, or extend parallel to each other, e.g., in a geometric sense. For example, two first conductive path sections may be arranged one above the other, e.g., overlapping, along the subsection in the structure of the circuit board with respect to the third direction, or at least their starting points may be arranged one above the other and their end points may be arranged one above the other. Such conductive path sections have concurrence at their starting points and have concurrence at their ending points. The starting and end points may be arranged as vias.

The concurrent conductive path sections receive or generate signals that each have the same phase, so that the serial wiring of the parallel conductive path sections results in an increase in the signal level.

For example, the first conductive path sections of the first receiving conductive path are arranged exactly on four layers of the circuit board.

When measuring an angular position, the scale element and the scanning element are, as mentioned above, arranged rotatably about the axis relative to each other. For example, for measuring an angular position, the first receiving conductive path extends, for example, in the first direction along an arc segment over a first angle of less than 180°, e.g., less than 135°, less than 90°, etc. The angle should be understood as a center point angle about a point on the axis.

For example, exactly two first conductive path sections are arranged concurrently along the subsection and offset in relation to each other with respect to the third direction. In contrast, only exactly one further first conductive path section extends along the first section, without a first conductive path section extending concurrently to the further first conductive path section with respect to the third direction.

For example, the first receiving conductive path has a periodic path with a period length along the first direction, and the first section in the first direction extends over a length that is at least as large as half the period length. A period length should be understood as an angular or radian measure for measuring an angular position, so that the period length can be specified in degrees, for example. Accordingly, the length over which the section extends in the first direction can also be considered as an angular measure.

For example, the subsection is arranged offset to the first section in the first direction.

For example, the multilayer circuit board also includes a second receiving conductive path that extends over a linear path or a curved path along the first direction and which is arranged offset in the first direction with respect to the first receiving conductive path. The second receiving conductive path includes a plurality of second loops that are formed from a plurality of second conductive path sections. The second conductive path sections are wired in series and thus form an electrically continuous conductor track. In the structure of the circuit board, two second conductive path sections are arranged concurrently along the subsection and offset in relation to each other with respect to the third direction. A further of the second conductive path sections extends along a second section, which is offset in the first direction relative to the subsection, without a second conductive path section being offset with respect to the third direction and extending concurrently to the further second conductive path section.

The first receiving conductive path and the second receiving conductive path are on one and the same receiving track. Like the first receiving conductive path, the second receiving conductive path may extend along the first direction over a linear path or a curved path. This path includes subsections, namely the subsection and the first section.

For example, the first receiving conductive path and the second receiving conductive path have a periodic path along the first direction, e.g., each having the same period length.

For example, the first section is arranged offset from the second section in the first direction, so that the first section and the second section do not overlap.

For example, the first conductive path sections of the first receiving conductive path and the second conductive path sections of the second receiving conductive path, i.e., both receiving conductive paths together, are arranged on exactly four layers in the structure of the circuit board.

For example, the second receiving conductive path extends in the first direction along an arc segment over a second angle of less than 180°, e.g., less than 135°, less than 90°, etc. For example, the second receiving conductive path may extend in the first direction along an arc segment over a similarly large angle as the first receiving conductive path, in which the first receiving conductive path is arranged offset relative to the second receiving conductive path in the first direction.

For example, exactly two second conductive path sections are arranged along the subsection in the structure of the circuit board, offset in relation to each other with respect to the third direction and concurrently. Exactly one of the second conductive path sections extends along the second section in the structure of the circuit board, without a further second conductive path section being offset with respect to the third direction and extending concurrently to the first conductive path section.

The excitation track, for example, encloses the first receiving conductive path and the second receiving conductive path.

For example, the second receiving conductive path has a periodic path with a period length along the first direction, with the second section extending in the first direction over a length that is at least as large as half the period length.

For example, the first and second receiving conductive paths respectively have a periodic path with the period length along the first direction, in which, in the first direction, the first section extends over a length and the second section extends over an equal length.

Further features and aspects of example embodiments of the present invention are described in more detail below with reference to the appended schematic Figures.

DETAILED DESCRIPTION

Figures 1, 2:
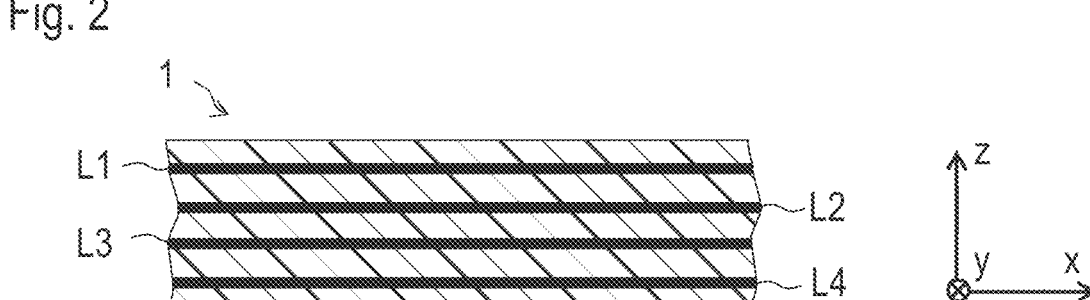
FIG. 1 is a top view of a scanning element.
FIG. 2 is an enlarged cross-sectional view through the scanning element.

FIG. 1 illustrates a scanning element for a position measuring device, in which the scanning element includes a circuit board 1.

Figure 3:
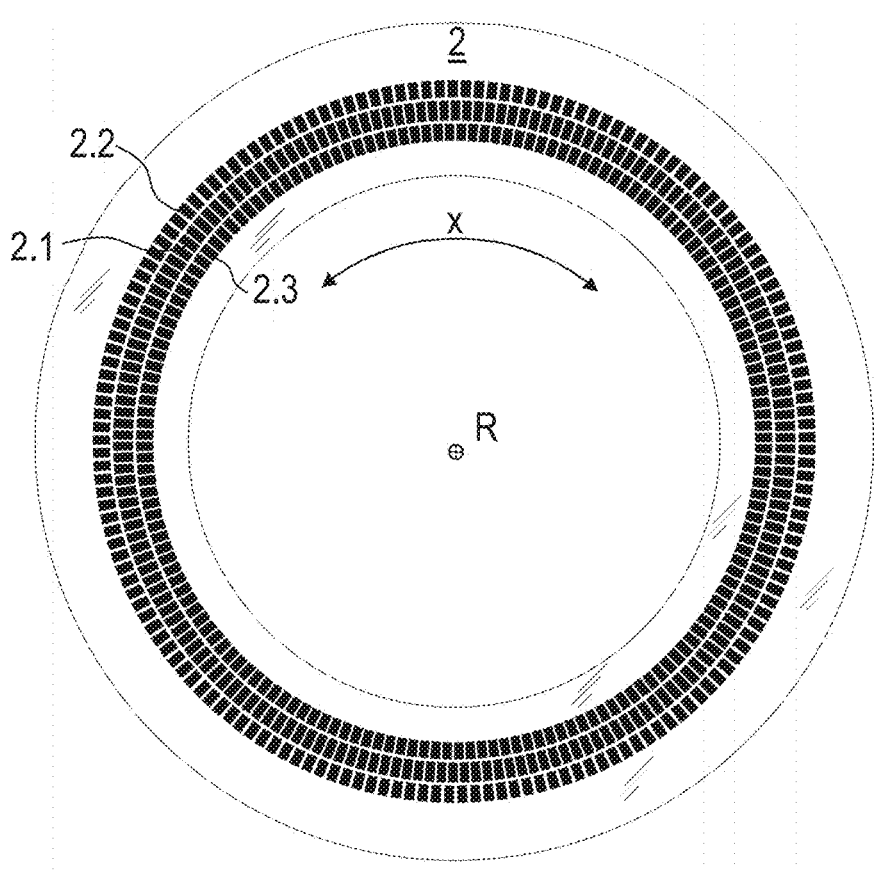
FIG. 3 is a top view of a scale element.
Figure 4:
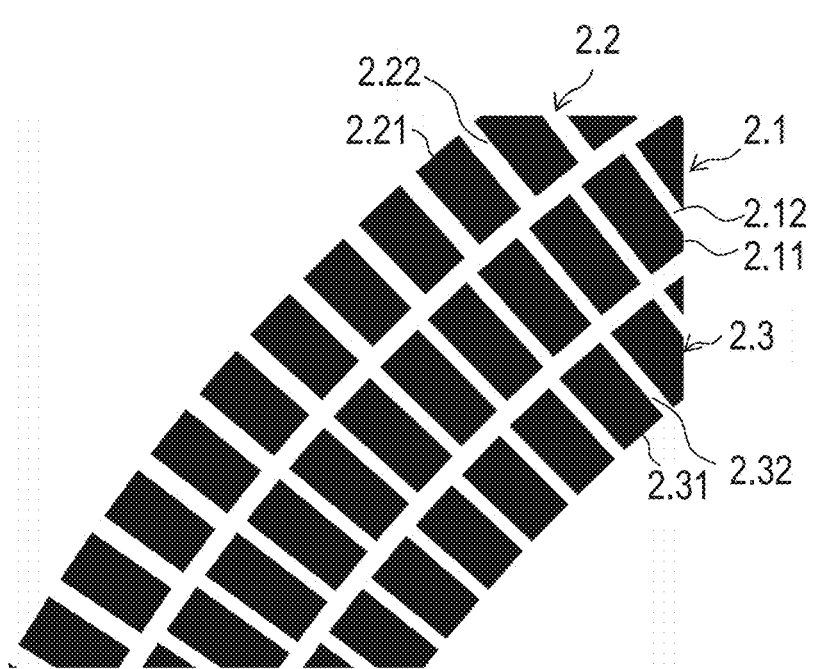
FIG. 4 is an enlarged view of the scale element.

The scanning element can be used to detect an angular position of a scale element 2, which is illustrated in a top view in FIG. 3. The scale element 2 has a disk-shaped or ring-shaped form and is arranged rotatably about an axis R relative to the circuit board 1. It includes a substrate, which, for example, is produced from epoxy resin and on which three graduation tracks 2.1, 2.2, 2.3 are arranged. The graduation tracks 2.1, 2.2, 2.3 are annular and are arranged concentrically with respect to the axis R with different diameters on the substrate. The graduation tracks 2.1, 2.2, 2.3 include graduation structures, each including a periodic sequence of alternately arranged electrically conductive graduation regions 2.11, 2.21, 2.31 and non-conductive graduation regions 2.12, 2.22, 2.32 (see, e.g., FIG. 4). In the illustrated example embodiment, copper is applied to the substrate as the material for the electrically conductive graduation regions 2.11, 2.21, 2.31. In the non-conductive graduation regions 2.12, 2.22, 2.32, on the other hand, no layer is applied to the substrate. Alternatively, the scale element may also have a steel substrate coated with an insulating layer to which graduation regions, e.g., made of copper, are applied.

With the arrangement with three graduation tracks 2.1, 2.2, 2.3 the angular position of the scale element 2 can be determined absolutely. The middle graduation track 2.1 of the scale element 2 has the largest number (e.g., 182 pairs) of graduation regions 2.11, 2.12 along a circumferential line, so that, through this, the greatest resolution with respect to the measurement of the angular position can be achieved. The inner graduation track 2.3 has the smallest number of graduation regions 2.31, 2.32 along a circumferential line. For example, in the illustrated example embodiment, these are 168 electrically conductive graduation regions 2.31 and 168 non-conductive graduation regions 2.32. Additionally, the outer graduation track 2.2 has a intermediate number, e.g., 169 pairs, of graduation regions 2.21, 2.22, which is smaller than that of the middle graduation track 2.1.

FIG. 1 is a top view of the circuit board 1. The circuit board includes three receiving tracks D, E, F that extend along a first direction x, which can also be referred to as the measuring direction and extends about the axis R in the circumferential direction.

FIG. 2 is a schematic partial cross-sectional view, which is not drawn to scale, of the circuit board 1. As mentioned above, the circuit board 1 has a multi-layer structure and, therefore, includes a first electrically conductive layer L1, a second electrically conductive layer L2, a third electrically conductive layer L3, and a fourth electrically conductive layer L4. In addition, electronic components are mounted on the circuit board 1. The geometric relationships between the individual elements can be defined using a coordinate system. A first direction x is the direction along which a position or angle measurement is to be carried out as intended. In the illustrated example embodiment, the first direction x corresponds to the circumferential direction. The axis R, about which the scale element 2 is rotatable, extends parallel to a third direction z. Thus, the third direction z can also be referred to as the axial direction. A second direction y, which can also be referred to as the radial direction, is oriented orthogonal to the third direction z and the first direction x. The electrically conductive layers L1 to L4 are thus arranged offset to each other in the third direction z, as illustrated in FIG. 2.

The receiving tracks D, E, F are arranged in the four electrically conductive layers L1 to L4, respectively in a band with a defined radial extent. The electrically conductive layers L1 to L4 are structured such that a first receiving conductive path 1.1 and a second receiving conductive path 1.2 are formed, as illustrated in FIG. 1. The two receiving conductive paths 1.1, 1.2. are offset from each other in the first direction x (circumferential direction) so that they can supply two phase-shifted signals corresponding to the offset. The receiving conductive paths 1.1, 1.2 are arranged as ring segments and extend in the first direction x (measuring direction). This means that the scale element 2 is only scanned along one circumferential segment and not simultaneously over the entire circumference, as is often the case in conventional systems. In the illustrated example embodiment, the first receiving conductive path 1.1 extends in the first direction x along an arc segment over a first angle α1 of approx. 25°. The second receiving conductive path 1.2 also extends in the first direction x along an arc segment over a second angle α2 which differs slightly from α1. The structure of all three receiving tracks D, E, F is explained in more detail using the middle first receiving track D as an example.

Figures 5A, 5B, 5C, 5D, 5E:
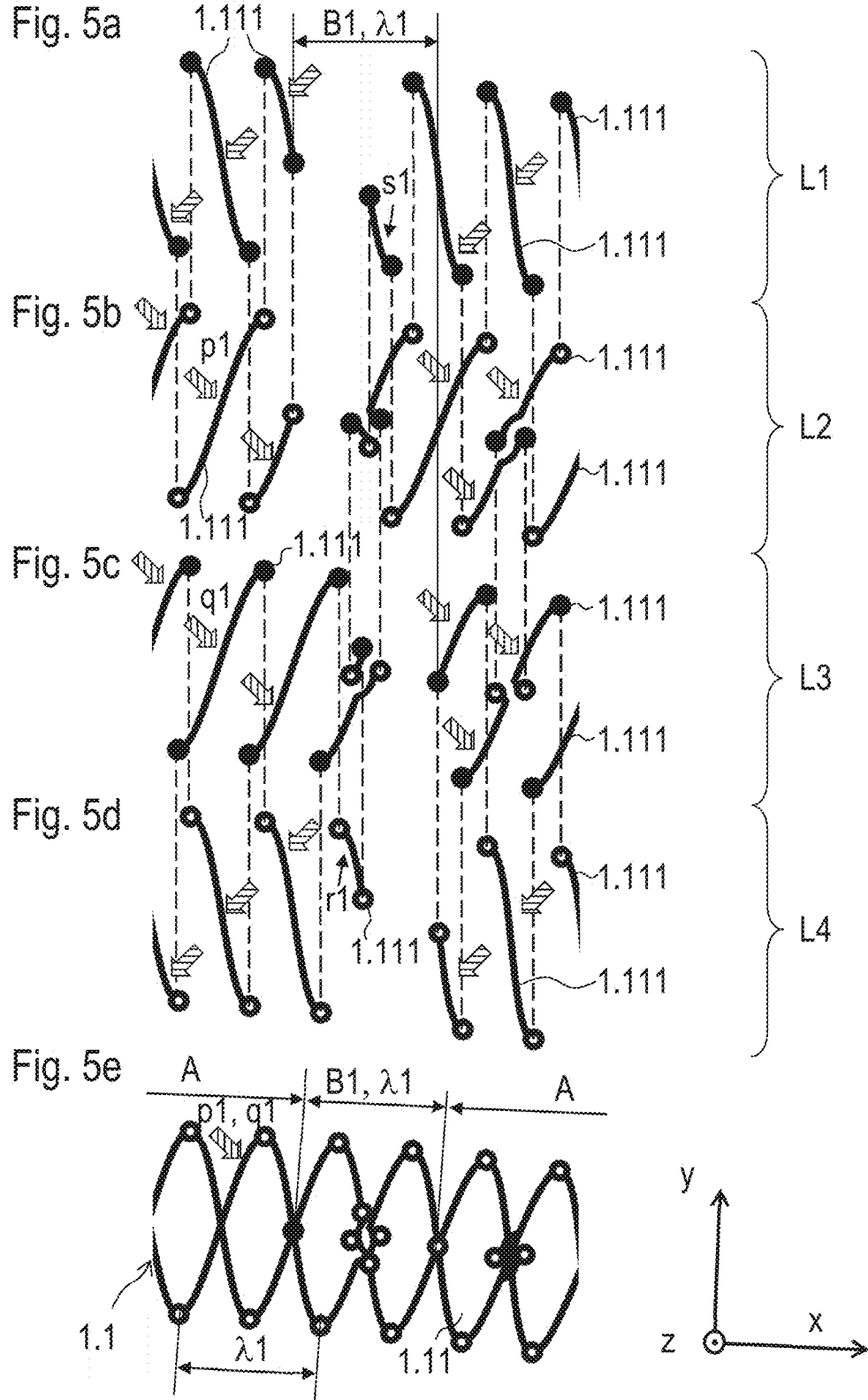
FIG. 5a is an enlarged view of first conductive path sections of a first layer of a circuit board of the scanning element
FIG. 5b is an enlarged view of first conductive path sections of a second layer of the circuit board of the scanning element.
FIG. 5c is an enlarged view of first conductive path sections of a third layer of the circuit board of the scanning element.
FIG. 5d is an enlarged view of first conductive path sections of a fourth layer of the circuit board of the scanning element.
FIG. 5e is an enlarged view of first conductive path sections of all four layers of the circuit board of the scanning element.

As illustrated in FIG. 5e, the first receiving conductive path 1.1 includes a plurality of first loops 1.11, in which the first loops 1.11 are formed from a plurality of first conductive path sections 1.111 that are wired in series. In addition, the first conductive path sections 1.111 are connected with vias in the different layers L1 to L4 in order to avoid unwanted short circuits. Although, strictly speaking, the first receiving conductive path 1.1 includes many conductive path sections 1.111, which respectively are distributed on the different layers L1 to L4 and are arranged in a row, such a structure is hereinafter collectively referred to as one receiving conductive path 1.1.

FIGS. 5a to 5d illustrate the paths of the first conductive path sections 1.111 in each of the four layers L1 to L4 and with respect to the first direction x in a partial region. For clarity, not every first conductive path section 1.111 is labeled with a reference numeral. Layer L1 is the top layer, followed by the second, third, and fourth layers L2 to L4 (offset in the −z direction). The fourth layer L4 is the bottom layer. FIG. 5e id a top view of the circuit board 1, in which all four layers L1 to L4 are illustrated, with the first layer L1 as the uppermost layer. Each of the first conductive path sections 1.111, for example, have through-connections or, for example, vias at their ends to a layer L1 to L4 above or below them. In FIGS. 5a to 5d, the contacts or, for example, the wiring of the individual first conductive path sections 1.111 are illustrated by dashed lines for explanation purposes. In addition, arrows are included in FIGS. 5a to 5d to illustrate which first conductive path sections 1.111 are arranged offset to each other with respect to the third direction z and concurrently, for example, in parallel. The first conductive path sections 1.111, which are indicated by the arrows with the same cross-hatching arranged one above the other in FIGS. 5a to 5d, are arranged one above the other in the structure of the circuit board 1. For example, the first conductive path section 1.111, to which the vertically cross-hatched arrow p1 points, is offset with respect to the third direction z relative to the first conductive path section 1.111, to which the vertically hatched arrow q1 points. As illustrated in FIGS. 5b and 5c, the relevant first conductive path sections 1.111 also extend concurrently, for example, in parallel, to each other in layers L2 and L3. This parallel arrangement of the first conductive path sections 1.111 in the different layers L1 to L4 is interrupted in a first section B1. In this first section B1, a connection is made from the fourth layer L4 to the first layer L1 for the purpose of wiring the individual first conductive path sections 1.111 in series. In this context, the first conductive path section 1.111, to which the arrow r1 points in FIG. 5d, is initially electrically connected to a short first conductive path section 1.111 in the third layer L3. This short first conductive path section 1.111 in the third layer L3 is, in turn, connected to a short first conductive path section 1.111 in the second layer L2. At the other end of the short first conductive path section 1.111 in the second layer L2, contact is made to a first conductive path section 1.111 in the first layer L1, to which first conductive path section 1.111 the arrow s1 points. In this manner, a first conductive path section 1.111 in the fourth layer L4 is electrically connected in stages to a first conductive path section 1.111 in the first layer L1. In addition, the configuration of the first section B1 creates space for the second receiving conductive path 1.2, which is formed from second conductive path sections 1.211, arranged in the four layers L1 to L4 and cross over the first conductive path sections 1.111 in different layers L1 to L4 while being electrically insulated from each other.

FIG. 5e illustrates a subsection of the first receiving conductive path 1.1, in which loops 1.11 are formed from the individual first conductive path sections 1.111, as illustrated in FIGS. 5a to 5d. Along a subsection A, at least two first conductive path sections 1.111 are arranged in the structure of the circuit board 1 offset to each other with respect to the third direction z and concurrently, for example, in parallel. In other words, in the subsection A, loops 1.11 are arranged concurrently, for example, in parallel, one above the other in the structure of the circuit board 1. In contrast, at least one of the first conductive path sections 1.111 extends along a first section B1 in the structure of the circuit board 1, without a further first conductive path section 1.111 being offset with respect to the third direction z and extending concurrently, for example, in parallel, to one of the first conductive path sections 1.111. In the first section B1, for example, a single loop 1.11 extends without a further, e.g., parallel, loop 1.11 offset in the third direction.

FIGS. 6a to 6d illustrate the paths of the second conductive path sections 1.211 in the four layers L1 to L4, analogous to FIGS. 5a to 5d. FIG. 6e is a top view of the circuit board 1, in which all four layers L1 to L4 are illustrated, with the first layer L1 as the uppermost layer.

Figures 6A, 6B, 6C, 6D, 6E:
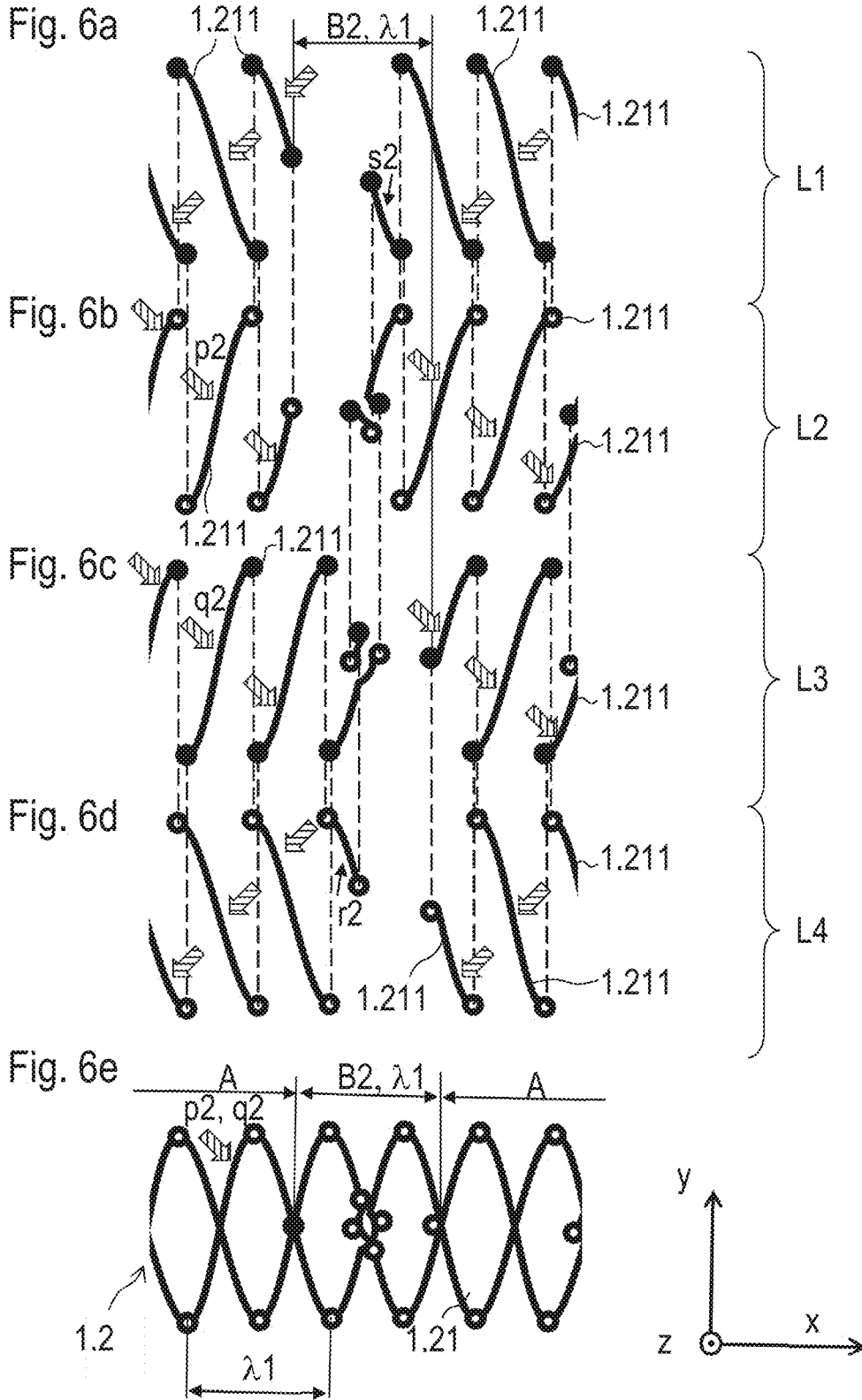
FIG. 6a is an enlarged view of second conductive path sections of a first layer of a circuit board of the scanning element.
FIG. 6b is an enlarged view of second conductive path sections of a second layer of the circuit board of the scanning element.
FIG. 6c is an enlarged view of second conductive path sections of a third layer of the circuit board of the scanning element.
FIG. 6d is an enlarged view of second conductive path sections of a fourth layer of the circuit board of the scanning element.
FIG. 6e is an enlarged view of second conductive path sections of all four layers of the circuit board of the scanning element.

The second conductive path sections 1.211 also each have through-connections to a layer L1 to L4 above or below them. In FIGS. 6a to 6d, the contacts or, for example, the wiring of the individual second conductive path sections 1.211 are illustrated by dashed lines for explanation purposes. In addition, arrows are included in FIGS. 6a to 6d to illustrate which second conductive path sections 1.211 are arranged offset to each other with respect to the third direction z and concurrently, for example, in parallel. The second conductive path sections 1.211, which are indicated by the arrows with the same cross-hatching arranged one above the other in FIGS. 6a to 6d, are arranged one above the other in the structure of the circuit board 1. Accordingly, the second conductive path section 1.211, to which the vertically cross-hatched arrow p2 points, is offset with respect to the third direction z relative to the second conductive path section 1.211, to which the vertically cross-hatched arrow q2 points. As illustrated in FIGS. 6b and 6c, the relevant second conductive path sections 1.211 also extend concurrently, for example, in parallel to each other in layers L2 and L3. This parallel arrangement of the second conductive path sections 1.211 in the different layers L1 to L4 is interrupted in a second section B2. In this second section B2, a connection is made from the fourth layer L4 to the first layer L1 for the purpose of wiring the individual second conductive path sections 1.211 in series. In this context, the second conductive path section 1.211, to which the arrow r2 points in FIG. 6d, is first electrically connected to a short second conductive path section 1.211 in the third layer L3. This short second conductive path section 1.211 in the third layer L3 is, in turn, connected to a short second conductive path section 1.211 in the second layer L2. At the other end of the short second conductive path section 1.211 in the second layer L2, contact is made to a second conductive path section 1.211 in the first layer L1, to which second conductive path section 1.211 the arrow s2 points. In this manner, a second conductive path section 1.211 in the fourth layer L4 is electrically connected in stages to a second conductive path section 1.211 in the first layer L1. In addition, the configuration of the second section B1 creates space for the first receiving conductive path 1.1 formed from first conductive path sections 1.111 that are also located in the four layers L1 to L4 and cross over the second conductive path sections 1.211 in different layers L1 to L4 while being electrically insulated from each other.

FIG. 6e illustrates a subsection of the second receiving conductive path 1.2, in which loops 1.21 are formed from the individual second conductive path sections 1.211, as illustrated in FIGS. 6a to 6d. Along the subsections A, at least two second conductive path sections 1.211 are arranged in the structure of the circuit board 1 offset to each other with respect to the third direction z and concurrently, for example, in parallel. In other words, in the subsections A, loops 1.21 extend concurrently, for example, in parallel, one above the other in the structure of the circuit board 1. In contrast, at least one of the second conductive path sections 1.211 extends along the second section B2 in the structure of the circuit board 1, without a further second conductive path section 1.211 being offset with respect to the third direction z and concurrently, for example, in parallel, to one of the second conductive path sections 1.211. In the second section B2, for example, a single loop 1.21 extends without a further parallel loop 1.21 offset in the third direction.

The receiving conductive paths 1.1, 1.2 or, for example, the associated loops 1.11, 1.21 have a spatially periodic path that is substantially sine-shaped or sinusoidal. The first receiving conductive path 1.1 and the second receiving conductive path 1.2 of the receiving track D have a first period length $\lambda 1$. The receiving conductive paths 1.4, 1.5 of the receiving track E have a second period length $\lambda 2$ and the receiving conductive paths 1.6, 1.7 of the receiving track F have a third period length $\lambda 3$. In the illustrated example embodiment, the first period length $\lambda 1$ is smaller than the second period length $\lambda 2$, and the second period length $\lambda 2$ is smaller than the third period length $\lambda 3$ (i.e., $\lambda 1 < \lambda 2 < \lambda 3$), and the period lengths $\lambda 1$, $\lambda 2$, $\lambda 3$ are specified as angular dimensions in degrees.

In the illustrated example embodiment, within the receiving track D, the first and second receiving conductive paths 1.1, 1.2 are arranged or offset in the first direction such that they provide 0° and 90° signals. The same consideration also applies to receiving tracks E, F, whose receiving conductive paths 1.4, 1.5, 1.6, 1.7 also provide 0° and 90° signals.

The first receiving track D provides position signals with a higher resolution than the other two receiving tracks E, F, e.g., because the first period length $\lambda 1$ is smaller than the second period length $\lambda 2$.

Figure 7:
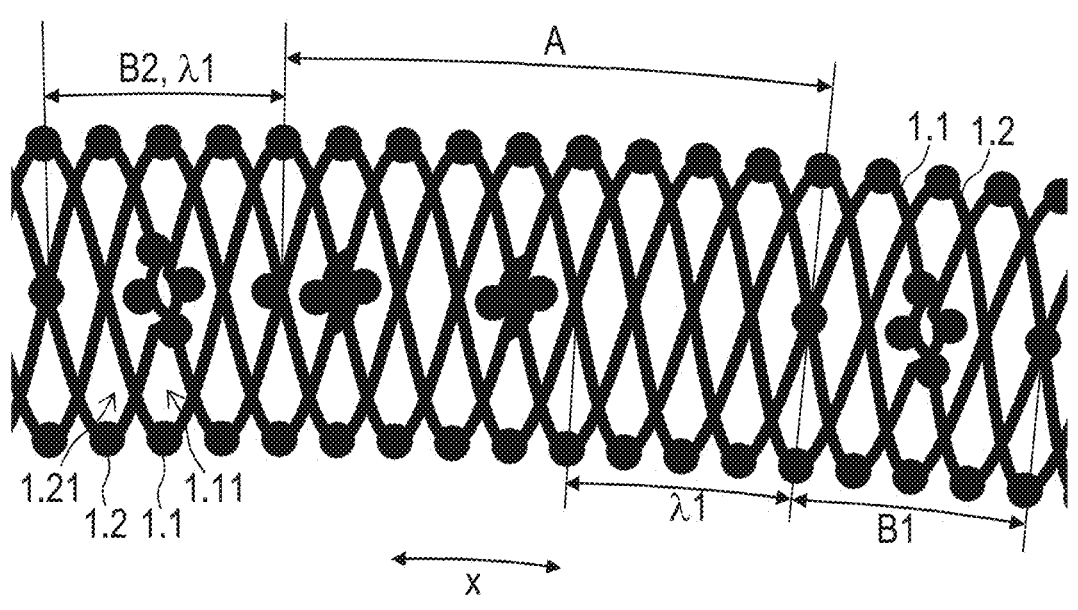
FIG. 7 is an enlarged view of the first and second receiving conductive paths.

In FIG. 7, the first receiving conductive path 1.1 and the second receiving conductive path 1.2 or, for example, the loops 1.11, 1.21 formed therefrom are illustrated one above the other, as is the case in the structure of the circuit board 1. In the first section B1, there are vias through which a first conductive path section 1.111 in the fourth layer L4 is electrically connected in stages to a first conductive path section 1.111 in the first layer L1. Similarly, in the second section B2, there are second conductive path sections 1.211, which are also electrically connected in stages with vias to a second conductive path section 1.211 in the first layer L1. Vias are also illustrated at the edges of the first section B1 and the second section B2 in FIG. 7. These form, so to speak, reversal points for the loops 1.11, 1.21, so that in subsection A the loops 1.11, 1.21 are formed double in the structure of the circuit board 1, offset to each other in the third direction and parallel on different layers L1 to L4. In contrast, the loops 1.11 in the first section B1 and the loops 1.21 in the second section B2 are formed only once. Although four conductor paths of the receiving conductive paths 1.1, 1.2 extend within a period length λ1, only two phases are scanned or, for example, two signals (0°, 90° signals) are generated due to the serial wiring and the reversal points.

Furthermore, the circuit board 1 includes an excitation track 1.3, which has two excitation conductive paths. The excitation track 1.3 surrounds the first and second receiving tracks 1.1, 1.2.

In the assembled state, the circuit board 1 and the scale element 2 are arranged opposite one another with an axial distance or an air gap, so that when there is a relative rotation between the scale element 2 and the circuit board 1, a signal depending on the respective angular position can be generated in each of the receiving tracks D, E, F, and, for example, also in the receiving conductive paths 1.1, 1.2 by induction effects. A prerequisite for the formation of corresponding signals is that the excitation conductive paths of the excitation track 1.3 generate a time-varying electromagnetic excitation field in the region of the respective scanned graduation structures. In the illustrated example embodiment, the excitation conductive paths are formed as a plurality of planar-parallel single conductive paths through which current flows. The scanning element has an electronic circuit on the circuit board 1 with electronic components that are electrically connected to each other via further layers of the circuit board 1.

If the excitation track 1.3 is supplied with current in a corresponding current direction, a tubularly or cylindrically oriented electromagnetic field is formed around the excitation conductive paths. The field lines of the resulting electromagnetic field extend around the excitation tracks 1.3, in which the direction of the field lines depends in a conventional manner on the direction of the current in the excitation conductive paths. Eddy currents are induced in the region of the conductive graduation regions 2.11, 2.21, 2.31, so that a modulation of the field is achieved that is dependent on the angular position.

Accordingly, the relative angular position can be measured by the receiving conductive paths 1.1, 1.2. The receiving conductive paths 1.1, 1.2 are arranged such that they provide signals phase-shifted by 90°, so that the direction of rotation can also be determined. The signals generated by the receiving conductive paths 1.1, 1.2 are further processed utilizing some of the electronic components that form an evaluation circuit. The signals of the first receiving track D provide the highest or finest resolution of the angular position when scanning the middle graduation track 2.1 of the scale element 2.

For segment scanning, in which the first receiving conductive path 1.1 extends along an arc segment in the first direction x, relative pitching movements, i.e., twisting movements between the circuit board 1 and the scale element 2 about a pitch axis that is oriented perpendicular to the first direction x, e.g., radially, do not result in significant measurement errors when determining the angular position. The circuit board 1 or, for example, the scanning element described herein can largely compensate for such errors caused by pitching movements. In addition, the arrangement of the receiving conductive paths 1.1, 1.2 makes it possible to achieve an extremely high signal strength.

What is claimed is:

1. A scanning element for an inductive position measuring device, comprising:
    a multilayer circuit board having a first receiving conductive path extending along a first direction and an excitation track;
    wherein the first receiving conductive path includes a plurality of first conductive path sections wired in series;
    wherein, in a subsection, two of the first conductive path sections are arranged in the circuit board, offset to each other with respect to a third direction and concurrently, the third direction being oriented orthogonal to the first direction; and
    wherein in a first section, located offset to the subsection in the first direction, a further one of the first conductive path sections extends in the circuit board, without a first conductive path section being arranged in parallel to the further first conductive path section and offset with respect to the third direction.

2. The scanning element according to claim 1, wherein the first conductive path sections of the first receiving conductive path extend on exactly four layers of the circuit board.

3. The scanning element according to claim 1, wherein the first receiving conductive path extends in the first direction along an arc segment over a first angle of less than 180°.

4. The scanning element according claim 1, wherein in the subsection, exactly two first conductive path sections are arranged in the circuit board, offset to each other with respect to the third direction and concurrently, and exactly one further first conductive path section extends along the first section in the circuit board.

5. The scanning element according to claim 1, wherein the first receiving conductive path has a periodic path with a period length along the first direction, the first section in the first direction extends over a length that at least as large as half the period length.

6. The scanning element according to claim 1, wherein the subsection is arranged offset to the first section in the first direction.

7. The scanning element according to claim 1, wherein the circuit board includes a second receiving conductive path extending along the first direction, the second receiving conductive path including a plurality of second conductive path sections wired in series;
    wherein, in the subsection, two of the second conductive path sections are arranged in the circuit board, offset to each other with respect to the third direction and concurrently; and
    wherein, along a second section, arranged offset to the subsection in the first direction, a further one of the second conductive path sections extends in the circuit board, without a second conductive path section being arranged concurrently to the further second conductive path section and offset with respect to the third direction.

8. The scanning element according to claim 7, wherein the first receiving conductive path and the second receiving conductive path have a periodic path with a same period length along the first direction.

9. The scanning element according to claim 7, wherein the first section is arranged offset to the second section in the first direction.

10. The scanning element according to claim 7, wherein the first conductive path sections of the first receiving conductive path and the second conductive path sections of the second receiving conductive path extend on exactly four layers of the circuit board.

11. The scanning element according to claim 7, wherein the second receiving conductive path extends in the first direction along an arc segment over an angle of less than 180°.

12. The scanning element according to claim 7, wherein the first receiving conductive path extends in the first direction along an arc segment over a first angle of less than 180°, the second receiving conductive path extends in the first direction along an arc segment over a second angle of less than 180°, and the first receiving conductive path is arranged offset relative to the second receiving conductive path in the first direction.

13. The scanning element according to claim 7, wherein, in the subsection, exactly two second conductive path sections are arranged in circuit board, offset to each other with respect to the third direction and concurrently, and exactly one of the second conductive path sections extends in the second section in the circuit board.

14. The scanning element according to claim 7, wherein the second receiving conductive path has a periodic path with a period length along the first direction, and the second part, in the first direction, extends over a length that is at least as large as half the period length.

15. The scanning element according to claim 7, wherein the first receiving conductive path and the second receiving conductive path have a periodic path with a period length along the first direction, and, in the first direction, the first section and the second section have equal lengths.

16. The scanning element according to claim 1, wherein the first direction is linear.

17. The scanning element according to claim 1, wherein the first direction is a circumferential direction.

18. The scanning element according to claim 12, wherein the first angle is different from the second angle.

19. The scanning element according to claim 18, wherein the first angle is approximately 25°.

20. The scanning element according to claim 1, wherein the first direction corresponds to a measurement direction of the position measuring device.

21. The scanning element according to claim 1, wherein, in the subsection, the two of the first conductive path sections are arranged in parallel.

22. The scanning element according to claim 1, wherein the first conductive path sections are wired in series by vias to form an electrically continuous conductor track.

23. The scanning element according to claim 1, wherein the first conductive path sections form a plurality of loops arranged in the subsection, the loops being arranged in parallel, one above another in the circuit board; and wherein, in the first section, a single loop of the first conductive path sections extends in the circuit board without a further loop of first conductive path sections offset with respect to the third direction.

24. The scanning element according to claim 23, wherein the loops in the subsection are adapted to generate signals having a same phase to increase a signal level by the series wiring of the first conductive path sections.

* * * * *